US008930944B2

(12) United States Patent  
Goodwin et al.

(10) Patent No.: US 8,930,944 B2  
(45) Date of Patent: Jan. 6, 2015

(54) APPLICATION MODEL THAT INTEGRATES THE WEB EXPERIENCE WITH THE TRADITIONAL CLIENT APPLICATION EXPERIENCE

(75) Inventors: Margaret Goodwin, Lynnwood, WA (US); Mark A. Alcazar, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 2258 days.

(21) Appl. No.: 10/715,804

(22) Filed: Nov. 18, 2003

(65) Prior Publication Data

US 2005/0108678 A1 May 19, 2005

(51) Int. Cl.  
G06F 9/44 (2006.01)  
G06F 9/445 (2006.01)

(52) U.S. Cl.  
CPC .. *G06F 8/61* (2013.01); *G06F 8/20* (2013.01); *G06F 9/4448* (2013.01)  
USPC .......................................... 717/178; 717/120

(58) Field of Classification Search  
None  
See application file for complete search history.

(56) References Cited

U.S. PATENT DOCUMENTS

| 5,388,211 A | 2/1995 | Hornbuckle |
| 5,835,777 A | 11/1998 | Staelin |
| 5,960,204 A | 9/1999 | Yinger et al. |
| 5,964,836 A | 10/1999 | Rowe et al. |
| 5,995,756 A | 11/1999 | Herrmann |
| 6,005,566 A * | 12/1999 | Jones et al. .................. 715/788 |
| 6,018,619 A | 1/2000 | Allard et al. |
| 6,052,716 A | 4/2000 | Gibson |
| 6,115,040 A | 9/2000 | Bladow et al. |
| 6,125,402 A | 9/2000 | Nagarajayya et al. |
| 6,157,948 A | 12/2000 | Inoue et al. |
| 6,226,747 B1 | 5/2001 | Larsson et al. |
| 6,243,091 B1 | 6/2001 | Berstis |
| 6,272,556 B1 | 8/2001 | Gish |
| 6,282,711 B1 | 8/2001 | Halpern et al. |
| 6,289,512 B1 | 9/2001 | Edwards et al. |

(Continued)

FOREIGN PATENT DOCUMENTS

| JP | 177932 | 6/2003 |
| JP | 2003169372 (A) | 6/2003 |

(Continued)

OTHER PUBLICATIONS (Unpublished) U.S. Appl. No. 10/974,422, filed Oct. 26, 2004 by Anderson et al., entitled "Hosting Environment Abstraction Model for Content," which is a U.S. Appl. No. 11/031,548.

(Continued)

*Primary Examiner* — Jason Mitchell  
(74) *Attorney, Agent, or Firm* — Timothy Churna; Kate Drakos; Micky Minhas

(57) ABSTRACT

This Application Model includes elements that define the scope of an application, its startup and shutdown behavior, and how it manages windows and resources; provide basic navigation functionality, journaling and journal extensibility, browser integration, and Structured Navigation; and define the way an application is deployed, installed, activated, updated, rolled back, and removed from the system in a secure, non-impactful way. It also enables using the same tools and languages for Web applications and locally installed applications, and allows the same application to be hosted in the browser or in a standalone window, based on a compile-time attribute.

20 Claims, 5 Drawing Sheets

(56) References Cited

U.S. PATENT DOCUMENTS

| | | | |
|---|---|---|---|
| 6,347,398 B1 | 2/2002 | Parthasarathy et al. | |
| 6,381,742 B2 | 4/2002 | Forbes et al. | |
| 6,401,134 B1 | 6/2002 | Razavi et al. | |
| 6,405,364 B1* | 6/2002 | Bowman-Amuah | 717/101 |
| 6,442,754 B1 | 8/2002 | Curtis | |
| 6,466,967 B2 | 10/2002 | Landsman et al. | |
| 6,480,853 B1 | 11/2002 | Jain | |
| 6,496,979 B1 | 12/2002 | Chen et al. | |
| 6,535,912 B1 | 3/2003 | Anupam et al. | |
| 6,546,554 B1 | 4/2003 | Schmidt et al. | |
| 6,557,038 B1 | 4/2003 | Becker et al. | |
| 6,571,389 B1 | 5/2003 | Spyker et al. | |
| 6,574,617 B1* | 6/2003 | Immerman et al. | 707/1 |
| 6,574,618 B2 | 6/2003 | Eylon et al. | |
| 6,633,316 B1 | 10/2003 | Maddalozzo, Jr. et al. | |
| 6,654,888 B1 | 11/2003 | Cooper et al. | |
| 6,667,751 B1 | 12/2003 | Wynn et al. | |
| 6,668,338 B1 | 12/2003 | Todd et al. | |
| 6,684,383 B1 | 1/2004 | Natori et al. | |
| 6,691,113 B1 | 2/2004 | Harrison et al. | |
| 6,698,018 B1 | 2/2004 | Zimniewicz et al. | |
| 6,715,144 B2 | 3/2004 | Daynes et al. | |
| 6,742,026 B1* | 5/2004 | Kraenzel et al. | 709/222 |
| 6,769,123 B1 | 7/2004 | Chan | |
| 6,810,395 B1 | 10/2004 | Bharat | |
| 6,918,113 B2 | 7/2005 | Patel et al. | |
| 6,931,546 B1 | 8/2005 | Kouznetsov et al. | |
| 6,944,660 B2 | 9/2005 | Eshghi et al. | |
| 6,947,943 B2* | 9/2005 | DeAnna et al. | 707/100 |
| 6,959,320 B2 | 10/2005 | Shah et al. | |
| 6,971,001 B1* | 11/2005 | Rolfs | 713/1 |
| 6,981,281 B1 | 12/2005 | LaMacchia et al. | |
| 6,990,636 B2* | 1/2006 | Beauchamp et al. | 715/764 |
| 7,003,550 B1 | 2/2006 | Cleasby et al. | |
| 7,024,451 B2 | 4/2006 | Jorgenson | |
| 7,028,296 B2 | 4/2006 | Irfan et al. | |
| 7,062,567 B2 | 6/2006 | Benitez et al. | |
| 7,069,293 B2 | 6/2006 | Cox et al. | |
| 7,089,560 B1* | 8/2006 | Uhler et al. | 719/311 |
| 7,111,055 B2 | 9/2006 | Falkner | |
| 7,124,355 B1 | 10/2006 | Kukkal | |
| 7,395,534 B2 | 7/2008 | Alcazar et al. | |
| 2001/0037490 A1* | 11/2001 | Chiang | 717/2 |
| 2002/0016830 A1 | 2/2002 | Nicolai | |
| 2002/0032763 A1 | 3/2002 | Cox et al. | |
| 2002/0075321 A1 | 6/2002 | Sakatani | |
| 2002/0103902 A1 | 8/2002 | Nagel et al. | |
| 2002/0104015 A1 | 8/2002 | Barzilai et al. | |
| 2002/0120940 A1 | 8/2002 | Willard | |
| 2002/0147974 A1 | 10/2002 | Wookey | |
| 2002/0188941 A1 | 12/2002 | Cicciarelli et al. | |
| 2003/0051169 A1* | 3/2003 | Sprigg et al. | 713/201 |
| 2003/0084439 A1 | 5/2003 | Perkins et al. | |
| 2003/0101445 A1* | 5/2003 | Li et al. | 717/170 |
| 2003/0120762 A1 | 6/2003 | Yepishin et al. | |
| 2003/0145316 A1 | 7/2003 | McKinlay et al. | |
| 2003/0195923 A1 | 10/2003 | Bloch et al. | |
| 2003/0204843 A1 | 10/2003 | Barmettler et al. | |
| 2003/0212990 A1 | 11/2003 | Brodkorb et al. | |
| 2003/0225851 A1* | 12/2003 | Fanshier et al. | 709/208 |
| 2004/0003390 A1 | 1/2004 | Canter et al. | |
| 2004/0015483 A1 | 1/2004 | Hogan | |
| 2004/0015839 A1 | 1/2004 | Sarkar et al. | |
| 2004/0073904 A1 | 4/2004 | Hill | |
| 2004/0107291 A1* | 6/2004 | Gamo | 709/232 |
| 2004/0133563 A1 | 7/2004 | Harvey et al. | |
| 2004/0172443 A1 | 9/2004 | Alcazar et al. | |
| 2004/0172635 A1 | 9/2004 | Watt et al. | |
| 2004/0187023 A1 | 9/2004 | Alagna et al. | |
| 2004/0205574 A1 | 10/2004 | Sayers et al. | |
| 2006/0106807 A1* | 5/2006 | DeVitis et al. | 707/10 |
| 2006/0184931 A1 | 8/2006 | Rochette et al. | |

FOREIGN PATENT DOCUMENTS

| | | |
|---|---|---|
| JP | 2003208316 (A) | 7/2003 |
| WO | WO0196936 (A1) | 12/2001 |
| WO | WO2005045562 | 5/2005 |

OTHER PUBLICATIONS (Unpublished) U.S. Appl. No. 11/031,548, filed Jan. 7, 2005 by Anderson et al., entitled "Object Models Enabling Hosting Content in a Plurality of Environments," which is a Continuation of U.S. Appl. No. 10/974,422.

Christopher Anderson "Avalon: Creating Windows "Longhorn" User Experiences (Part 1): Application Model Fundamentals", Speaker Notes, 2003. 29 pages.

Christopher Anderson "Avalon: Creating Windows "Longhorn" User Experiences (Part 1): Application Model Fundamentals", Slide Presentation, PDC 2003. 2 pages.

Information Processing Society of Japan: New Edition: Information Processing Handbook, First Edition, Ohmusha, Ltd., Nov. 25, 1995, p. 711.

Kemp, "Persistent Client State HTTP Cookies", retrieved on Apr. 14, 2009 at <<http://www.ils.unc.edu/~kempa/cookies/icookie.html>>, Oct. 5, 1998, pp. 1-9.

Nikkei Windows 2000, Issue of Jan. 2000, 46th Issue, p. 244, Mikkei Business Publications, Inc., Jan. 1, 2001.

Non-Final Office Action mailed Oct. 26, 2004, for U.S. Appl. No. 10/974,422, 22 pages.

"Oracle Application Server", Release 4.0.8 EJB, ECO/Java and COBRA Application Developer Guide J00088-01, 1st Edition, ORACLE, Oct. 1999, pp. 4-13 to 4-16.

"Persistent Client State HTTP Cookies", retrieved on Apr. 1, 2007, at <<http://wp.netscape.com/newsref/std/cookies_spec.html>>, Netscape, 1999, pp. 1-5.

* cited by examiner

APPLICATION MODEL THAT INTEGRATES THE WEB EXPERIENCE WITH THE TRADITIONAL CLIENT APPLICATION EXPERIENCE

TECHNICAL FIELD

This invention relates to the creation of software applications, and more particularly, to the development of an application model that integrates the Web experience with the client application experience.

BACKGROUND OF THE INVENTION

Today there are essentially two types of applications: Web applications and traditional desktop or client applications. Web applications are a new type of software program that is commonly deployed as multiple Web pages accessible over the Internet. A conventional Web application includes multiple Web pages representing markup-based documents. The Web application may also include script or other resources that are accessed through the Web pages. Commonly, the Web app is stored on a Web server and downloaded to a local computer when used. Currently, it is not actually possible to download and install a typical Web app for subsequent use when the computer is offline.

Traditional desktop or client applications are software programs that are embodied largely if not exclusively in executable code, rather than HTML pages. Typically, desktop applications are installed directly to a local computer and execute on that computer. They execute with high permissions and typically take full advantage of the platform on which they are installed.

Both types of application have their own strengths and weaknesses. For instance, Web applications are easily installed and typically do not impact the local computer. Web applications provide users with an intuitive mechanism for navigating backward and forwards through the pages of the application. However, Web applications usually cannot take full advantage of the installed platform because they do not have sufficient execution permissions. Users commonly do not like the idea that an application so easily executed has full access to their computers.

In contrast, users commonly expect the traditional application to have heightened permissions because installing them is such a deliberate process. However, there is no way to limit the permissions under which a traditional application runs, so a user who chooses to install a traditional desktop application has to trust it completely. Also, once a user installs a traditional application, upgrades to the application are more difficult to obtain. Each time the user launches the application, the same version is executed, regardless of whether patches or upgrades to the application are available. Users often accept this tradeoff because the likelihood is significant that upgrading one traditional application may impact or disable another installed application.

These and other problems have faced software developers for some time. Until now, an adequate solution has eluded those skilled in the art.

SUMMARY OF THE INVENTION

The invention is directed at an "Application Model" that brings together the best characteristics of the Web experience with the best characteristics of traditional desktop applications, and bridges the gap between the two worlds. It provides a powerful framework for secure applications, simplifies development, deployment, and maintenance for client applications, and provides a simpler, more consistent user experience.

The Application Model includes elements that define the scope of an application, its startup and shutdown behavior, and how it manages windows and resources; provide basic navigation functionality, journaling and journal extensibility, browser integration, and Structured Navigation; and define the way an application is deployed, installed, activated, updated, rolled back, and removed from the system in a secure, non-impactful way.

DETAILED DESCRIPTION

Figure 1:
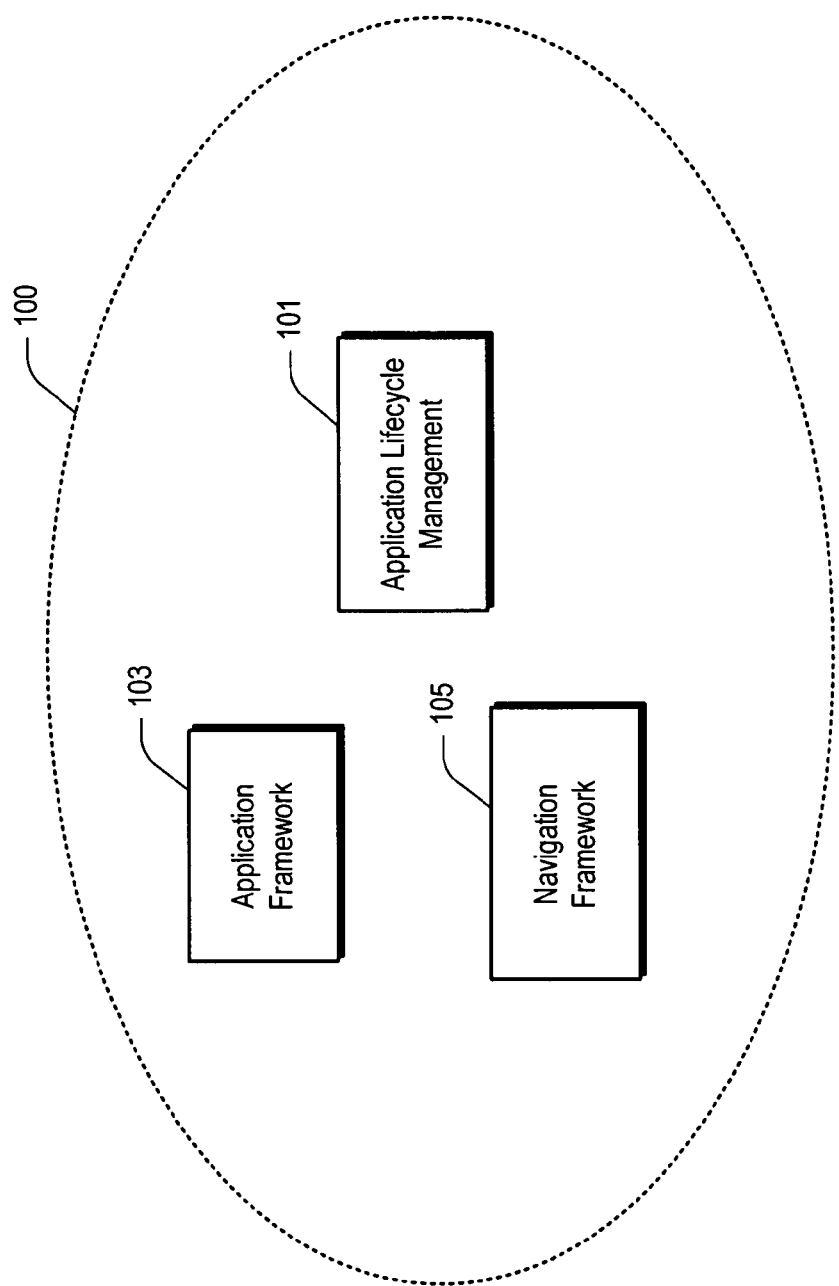
FIG. 1 is a functional block diagram generally illustrating an "Application Model" that brings together the best characteristics of the Web experience with the best characteristics of traditional desktop applications, and bridges the gap between the two worlds.

FIG. 1 is a functional block diagram generally illustrating an "Application Model" 100 that brings together the best characteristics of the Web experience with the best characteristics of traditional desktop applications, and bridges the gap between the two worlds. It provides a powerful framework for secure applications, simplifies development, deployment, and maintenance for client applications, and provides a simpler, more consistent user experience. The Application Model includes three elements: an Application Framework 101, a Navigation Framework 103, and Application Lifecycle Management 105. Each of these elements is described briefly here, and described in detail below.

The Application Framework 101 defines the scope of the application, its startup and shutdown behavior, and how it manages windows and resources, whether local or online. The application framework 101 provides the power and extensibility of the traditional desktop application in a way that is accessible to Web developers. It also supports a new genre of dialog that is more effective and less annoying than traditional modal dialogs and better integrated with its environment.

The Navigation Framework 103 builds on the Application Framework 101 to bring the best of the Web experience to the client application space. It includes basic navigation functionality, journaling and journal extensibility, browser integration, and Structured Navigation, which is a new and better way to build wizards and applications to walk users through complex or unfamiliar procedures in a way that leverages the familiar look and feel of the Web.

Application Lifecycle Management 105 defines the way an application is deployed, installed, activated, updated, rolled back, and removed from the system in a secure, non-impactful way that is easy to administer and less intrusive to users, similar to Web deployment today.

Illustrative Implementations

Figure 2:
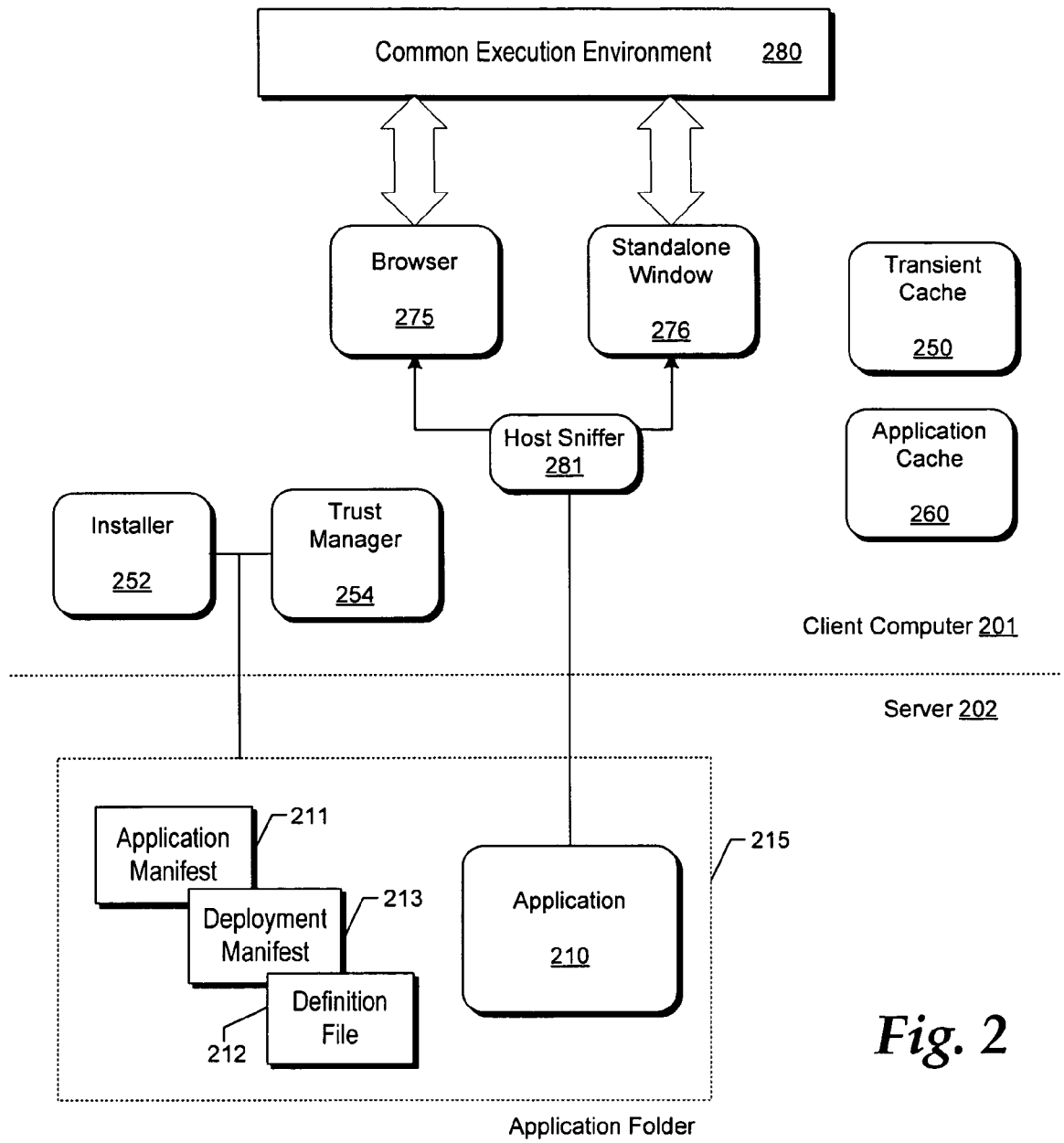
FIG. 2 is a functional block diagram of a network environment having a client computer, a server, and an application constructed in accordance with the Application Model.

FIG. 2 is a functional block diagram of a network environment having a client computer 201, a server 202, and an application 210 constructed in accordance with the Application Model 100 being described in this document. Currently, the application 210 is stored on the server 202 and is available for download to the client computer 201.

The application 210 includes an application manifest 211, an application definition file 212, and a deployment manifest 213. The application may also include other files (not shown) containing markup, code, and resources belonging to the application 210. The application manifest 211 declares the resources belonging to the application, as well as security permissions being requested by the application 210. The security permissions are discussed below in conjunction with FIG. 4. The application manifest 211 also describes the application's dependencies, such as additional libraries and resources that are needed to run the application 210. The application manifest 211 also specifies shell integration information, like file associations for the application 210 and whether to create shortcuts on the client computer 201 in the Start menu. The application definition file 212 provides a declarative definition of the application 210. The application definition file 212 may be written in XAML (extensible Application Markup Language) and code (using any managed code language). The deployment manifest 213 includes a URI that points to a current version of the application 210, and the intervals at which to check for updates.

Application Lifecycle Management

Application Lifecycle Management refers to the characteristics and features of the Application Model that relate to managing the installed state of an application throughout its lifecycle. To begin, the application 210 can either be run from the server (as an "Express Application"), or locally (as a "Managed Application"). In most cases, these choices don't require any code changes. They simply require changing an attribute in the application manifest 211.

An Express application is an application that runs from the server 202. While an Express application may be cached on the client computer 201 in a transient cache 250, it may be scavenged from the cache 250 at any time, based on available resources and on how recently it was used, so it is not guaranteed to work offline. An Express application may also require online resources to run properly. Express applications are always hosted in the browser, and cannot request permissions beyond a default permission set. This ensures that the user can navigate to the application and it loads without any prompts or dialogs, just like a Web page. Express applications don't create shortcuts or aliases to themselves, and have no permanent impact on the client computer 201. The advantage of Express applications over Web pages is that they are real applications that can take full advantage of the Application Framework and the Navigation Framework (described below), can run locally so they have better performance than server-side applications, and can fully exploit the client computer hardware and operating system features.

Managed applications are deployed the same way as Express applications. The application provider simply copies the application directory 215 and the deployment manifest 213 to the server. The user also accesses Managed applications the same way they access Express apps. The user navigates to an URL that points to the deployment manifest 213. Like Express applications, Managed applications download progressively to give the user immediate interaction with the application. Unlike Express applications, Managed applications are available offline, and are integrated with the client computer environment, which makes them more discoverable. Examples of this integration included shortcuts or aliases to, and file associations for, the Managed applications. Once a managed application is installed, it can either be launched from the Shell using a shortcut or alias, or by double-clicking a file associated with the application, or it can be navigated to in the browser by clicking a hyperlink, entering a URI in the address well, or selecting a stored hyperlink in a Favorites menu. Managed applications are always launched and run locally.

An installer 252 uses the application manifest 211 to control download and installation. The installer 252 also invokes a trust tanager 254 during installation. The trust manager 254 uses the application manifest 211 to determine what permissions the application requires to run. (See Security, below), what file associations to register, and the application name and icon to use in the Start menu and task bar.

When the user first navigates to the application 210, it is actually the deployment manifest 213 they navigate to. The deployment manifest 213 points to the URI where the latest version of the application is published, and the installer 252 downloads and installs the application 210 from there. This makes it possible to post updates to the application 210 without disrupting any downloads currently in progress, while keeping the same URI for the application 210. When a new version is posted, the deployment manifest 210 is changed to point to the new version. Any downloads in progress continue and any new navigations to the deployment manifest 213 are redirected to the latest version.

Progressive Installation

One of the advantages of the Web over traditional desktop applications is that when a user navigates to a Web page or application, it downloads progressively, so they can start interacting with it immediately. Traditionally, that hasn't been possible with desktop applications. The Application Model supports progressive download for Managed applications as well as Express applications. The application manifest 211 specifies subsets of components associated with the application 210 as Required, OnDemand, and Online. The subset designated as Required should include the minimum code necessary for the application 210 to run on the client computer 201, and will always include at least the application definition file 212 and the application's startup page. The subset of the application 210 designated as Required is downloaded immediately and stored in an application cache 260 on the client computer 201, and the application 210 is launched. Because the minimum code is considerably smaller than the full application, the user can begin interacting with the application right away, similar to a user's experience when interacting with a traditional Web application.

As the user interacts with the application 210, the resources designated as OnDemand are drizzle-download in the background. When the user requests a specific resource, e.g., by clicking a hyperlink, that resource takes precedence over the other resources that are drizzling down in the background and is downloaded on demand. As additional OnDemand resources are downloaded, they're stored in the application cache 260 as well. Resources that are designated as Online resources are stored in the transient cache 250. As resources are downloaded, the next time they're requested, they're retrieved from the application cache 260. Once the application 210 has been fully installed on the client computer 201, it may be navigated to in the browser or invoked from the shell, but it is always launched locally from the client computer 201.

Update, Rollback, Uninstall

When downloading the application 210, the installer 252 downloads a copy of the deployment manifest 213, which specifies the Uri to check for application updates and the intervals at which to check. The installer 213 polls the server 202 for updates at the intervals specified in the deployment manifest 213 to determine whether there is an update available. If there are any updates, the updated components of the application 210 are downloaded transparently in the background without interrupting the user. This ensures that the user always has the latest version of the application 210 whenever they launch it.

Users can painlessly rollback or uninstall the application 210 through Add/Remove Programs, and it will not impact other applications on the client computer 201. This is because applications are installed in their own isolated cache, with all the components they need to run. An application will not overwrite a resource required by another application because it has its own copy of all its dependencies. Because shortcuts and file associations are declared in the application manifest 211, which is used for installation, rollback, and uninstall, these will automatically be removed if the application 210 is uninstalled, and will be mapped to the appropriate version if the application 210 is rolled back.

Host in Browser vs. Standalone

One of the unique aspects of the Application Model is the ability to write the same application and decide at compile time whether to host it in the browser 275 or a stand-alone top level window 276. An attribute in the application file, named HostInBrowser, is used for this determination. Setting this attribute to "True" specifies that the application 210 should be hosted in the browser 275. Setting it to "False" specifies that the application 210 will be hosted in its own top-level window 276.

Unlike existing technologies, the application code is essentially identical in either case. Applications execute in a common execution environment 280 that can be either owned by the browser or not. When the code is launched, a host sniffer component 281 determines from the HostInBrowser attribute which hosting environment is appropriate. Based on that indicator, the code is launched in the appropriate hosting environment.

Launching the application 210 can occur in two ways: either by activating a link to the locally stored application, or by navigating to an URL in the browser. When launching the application 210 from the link, the shell may launch a shell extension handler registered to handle files of the type that was activated. The Shell extension handler for Application Model applications uses a host sniffer to determine the hosting environment in which to invoke the code. The host sniffer determines the value of the HostInBrowser attribute, and either instructs the shell server to launch the application 210 or to invoke the browser 275 with instructions to navigate to it.

Likewise, navigating to the application 210 using the browser 275 makes use of a mime-type handler, which is a handler registered with the browser 275 to handle mime-types associated with applications that may be hosted in more than one environment. The browser server proxy is configured to determine the host environment for the application using the host sniffer 281 and launch it in the appropriate hosting environment.

Today, whether an application runs in the browser or standalone is determined by whether it's run from a Web server or the local machine. Ideally, the hosting environment would be determined by the requirements of the application, rather than where the bits are stored.

The browser 275 is well-suited to task-based applications, whose purpose is to accomplish a specific task, like retrieving, submitting, or tracking data, configuring or managing resources, and the like. Hosting in the browser provides convenient serial access to applications, and relieves the user of having to manage multiple windows.

Standalone windows 276 are well suited to background-style applications, whose purpose requires that they stay open while the user interacts with other applications in the browser, and to applications that are not based on the navigation model. For example, document/content editors don't gain anything from being navigation-based. In this type of application, actions are initiated by the user, and there is no common sequence in which actions occur.

Background-style applications may be hosted in a standalone window, and can be minimized when the user isn't directly interacting with them. For example, people use media players to play music while they work, and they frequently interact with them to select a new song or playlist. This type of interaction should not interrupt their workflow. In other words, they shouldn't have to navigate away from the application they're currently using to perform some task in order to select a new song or playlist (especially if navigating to a new playlist would destroy their Forward stack so they couldn't easily return to their task). These types of applications make sense as a navigation application, but do not make sense to host in the browser 275.

The Application Model is equally well suited to either type of hosting, but the decision about how to host a particular application is up to the developer. Today, a developer has to decide before writing code whether the application will be a Web application or a traditional desktop application. This decision dictates everything from what language and tools the developer can use to write the application to the environment in which the application will be hosted at runtime. Because different types of applications require different tools and skillsets to write them, developers are typically limited to developing either Web applications or desktop applications, but seldom both. This invention makes it possible to use the same skillset and tools to develop either type of application.

Figure 3:
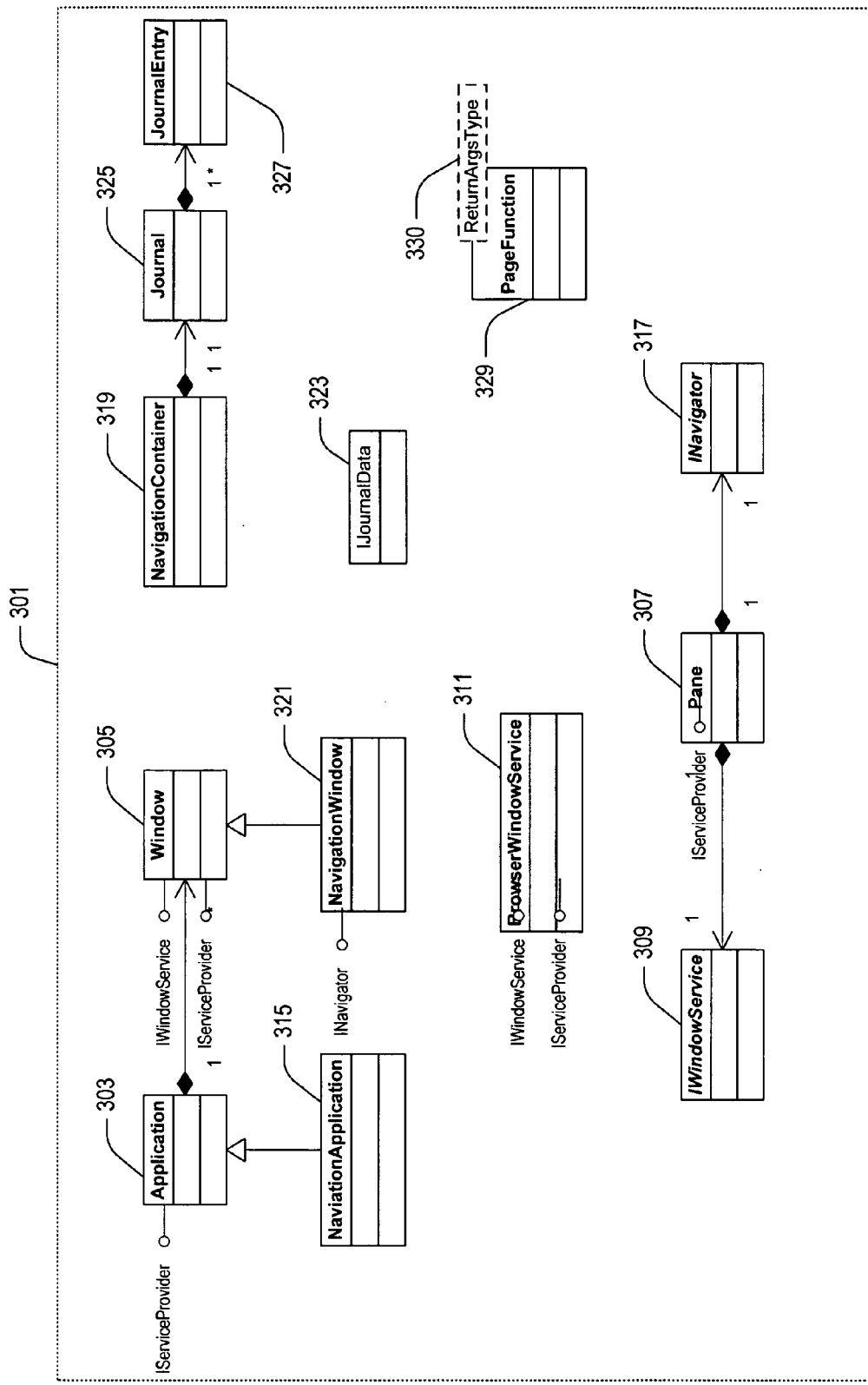
FIG. 3 is a functional block diagram generally illustrating certain components of an application implementing core elements of the Application Model.

FIG. 3 is a functional block diagram generally illustrating certain components of an application 301 constructed in accordance with the Application Model 100. The application 301 is essentially illustrated as a group of interrelated classes of code that may be used to implement the application 301. It will be appreciated that, when executed, many of the classes described will be instantiated as objects, although certain properties, methods, and events of the classes may still be employed statically. The components illustrated in FIG. 3 service both the Application Framework and the Navigation Framework elements of the Application Model. Accordingly, those two elements will be described with reference to the components illustrated in FIG. 3.

Application Framework

In traditional desktop programming, there is a Main function that defines the lifetime of a desktop application. The desktop application begins when Main( ) is invoked, and ends when Main( ) returns. In conventional Web programming, there is no corresponding function or object that scopes the application. In this Application Model, the application 301 is defined and scoped by an application object, which is a global object that persists in memory for the lifetime of each application session. The application object is an instance of an application class 303, described below. The application object has knowledge of the resources belonging to the application 301, and provides an isolation boundary between itself and other applications or external resources. It is used by the platform to identify, reference, and communicate with the application 301. It is also used within the application 301 to manage windows and resources, specify startup and shutdown behavior, handle configuration settings, specify visual styles for the application, share code, state, and resources across navigations, and handle application-wide events.

Application Class

The basic application class 303 is intended to be able to support any number of different types of applications, so it is designed to be as low-policy as possible. The only methods on the basic application class 303 are ShutDown, which closes the application 301, FindResource, which can be used to retrieve any resource belonging to the application 301, and GetService, which is used to retrieve any service exposed by the application 301.

On execution, the application object raises events on StartingUp, ShuttingDown, Activate (raised when one of the application's windows receives focus, after another application has had focus) and Deactivate (when the application loses focus), and SessionEnding (raised when the application is being ended by the system either because the system is shutting down or the user is logging off). The application can handle these events to perform whatever actions are necessary in response to the condition that raised them. The StartingUp, ShuttingDown, and SessionEnding events are cancelable, allowing the developer to prevent the action from taking place. In one embodiment, canceling SessionEnding is treated as a hint. There is no guarantee the session will not end, but it gives the developer a chance to save state or perform other necessary cleanup activities before the application is terminated.

The application class 303 has a static property of type "Application," called Current, that returns the current instance of the Application class 303. The Application class 303 has a Windows collection, which enables the application 301 to manage the windows belonging to the application 301. Whenever a new window is created, it is automatically added to this collection. The Application class 303 also has a MainWindow property which is used to get the application's primary window. For an application hosted in the browser, this may be the browser window. For other applications, this is set by default to the first window created, but may be explicitly set to a different window by the developer.

The Application class 303 also has a Resources collection, which is used to store resources, such as styles. Styles are rules for visually styling elements in a tree hierarchy. The scope of a style is the element to which the style is applied and its children. Styles are defined as resources so they can be added to the Resources collection. When a style is specified at the application object level, it applies to all the windows within the application 301 and, therefore, to every visual element in the application 301. A developer can use application object-level styles to enforce a consistent look and feel throughout the application 301.

The Application class 303 also defines a Settings property that is used to store and retrieve application settings. Finally, it has a ShutDownMode property, which controls what action causes the application 301 to be terminated. The options may include: Shut down when the Main Window is closed, Shut down when the last window has been closed, or only shut down when the ShutDown method is called.

Window Class

Windows in the Application Model support features like transparency, rotation, non-rectangular surface, etc., which aren't possible with conventional desktop windows today. The Window class 305 provides a service, by invoking GetService, that exposes a conventional window handle for the Window that can be used for interoperability with legacy windows, when parenting a legacy window to an Application Model window and vice versa.

The Window class 303 provides the typical properties available on windows today for accessing title, icon, size, position, style, state, whether the window has focus, whether it is visible, whether it is closed, whether to display it in a taskbar, whether it should be topmost, accessing its owned windows, etc. It also has a DialogResult property for obtaining the result if the window is a dialog.

The Window object raises events when it is Loading (about to open), Closing, Activated (receives focus), Deactivated (loses focus), and when its size, location, or state is changing.

The Window class 305 has methods to Show, Hide, Close, DragMove, GetService, ShowDialog, and ShowApplicationDialog. ShowApplicationDialog is equivalent to the conventional ShowDialog method, which shows the standard type of dialog users are familiar with today. This is a floating thread-modal dialog that blocks interaction with any window on the thread from which it was opened until the user closes it.

In contrast, the ShowDialog method of the window class 305 displays a new kind of dialog, which is modal only to its parent window. This dialog blocks interaction with the parent window's content, but other windows in the application 301 are still interactive. The dialog's parent window can still be moved, resized, minimized, maximized, or restored while the dialog is open. If the parent window is move or minimized, the dialog is moved or minimized along with it. If the parent window is minimized and then restored, the dialog is restored along with it, and the window content is still disabled until the user closes the dialog. This is a new concept for programmers and will provide a much better user experience for most cases when a dialog only applies to the content of a single window because it allows users to continue interacting with other windows in the application in a normal manner.

Pane Class

The pane class 307 provides a layer of abstraction that makes it possible to programmatically access common window properties without having to know whether the "window" is an actual stand-alone window or the system browser. The pane class 307 gets the BrowserWindowService, if hosted in the browser, or the IWindowService, if hosted in a standalone window, and uses that to communicate with the window or browser without the application 301 having to know which one is actually present. The pane class 307 exposes a Navigator property (the INavigator of the containing Window or BrowserWindowService), as well as all of the IWindowService properties (described below).

IWindowService Interface and the BrowserWindowService Class

The IWindowService interface 309 exposes the following properties: Text (the title), Icon, Top, Left, Height, Width, Maximum/MinimumContentHeight, Maximum/MinimumContentWidth, ContentSize, WindowState (Maximized, Minimized, Normal), and WindowAutoLocation (CenterScreen, CenterOwner, WindowsDefaultLocation, None).

The BrowserWindowService class 311 provides the properties exposed by IWindowService and, in addition, exposes the following properties and methods that are unique to the browser: DisplayMode (Normal, FullScreen, TheaterMode) and ShowMenuBar. It also has methods to start and stop graphical indications that a navigation is in progress, and a GetService method. A developer that wants to access browser-specific functionality can obtain the BrowserWindowService 311 by invoking GetService on the application object or on a NavigationWindow or Pane, providing that the application 301 is hosted in the browser. If it is not hosted in the browser, the request will return null.

Using the BrowserWindowService 311 explicitly sacrifices the host-agnosticism that allows the application 301 to be hosted either in the browser or standalone without making any significant change to code.

Navigation Framework

The third and final element of the Application Model 100 is the Navigation Framework. The Navigation Framework supports navigation-based applications that leverage users' familiarity with navigation and journaling metaphors on the Web to provide a more familiar, consistent user experience on the client, whether hosted in the system browser or a standalone top level window.

NavigationApplication Class

The purpose of the NavigationApplication class 315 is to make it easier for developers to write navigation-based applications. It is derived from the by that class. Additionally, the NavigationApplication class 315 has a StartupUri property that is used to specify a page or element to navigate to when the application 301 is first launched. It also has a Properties collection that allows the application developer to share global state across pages without having to subclass the Application, and supports databinding to these properties. A Connected property tells whether the machine the application is running on is currently connected to a network.

The NavigationApplication class 315 also listens for navigation events on NavigationContainers (described below) within the application 301 and re-fires the events, so the application developer can create handlers for all application-wide events in a single place. If a NavigationApplication is not hosted in the browser, the default window created for it is a NavigationWindow.

The NavigationApplication object provides a Properties collection to store and retrieve arbitrary application state that can be shared across the entire application as well as providing a single place to handle navigation events throughout the application 301. By using the NavigationApplication class, properties can be stored without having to learn subclassing. This simplifies the development process for developers who aren't familiar with the concept of subclassing.

INavigator Interface and NavigationContainer Class

The INavigator interface 308 exposes navigation-related properties, methods, and events for the application 301. Any element that allows navigation implements the INavigator interface 308. The INavigator interface 308 provides an ID property to allow it to be specified as the target of a hyperlink navigation. It has a Uri property that can provide the current Uri of the INavigator's content if a navigation is not in progress, or the Uri being navigated to if there is a navigation in progress. Setting this property initiates a navigation to the Uri specified. There is also a CurrentUri property, which is read-only, and returns the current Uri, even when a navigation is in progress. A Content property provides access to the root of the element tree contained within the INavigator. A Journal property returns the Journal instance in which navigations are tracked, while CanGoForward and CanGoBack properties tell whether there are any entries in the Forward or Back branch of the Journal, respectively. A Synchronous property specifies whether navigations are performed synchronously or asynchronously. (See Synchronous/Aysynchronous Navigation below.)

The INavigator interface 317 has several overloaded navigation methods, which variously allow navigation to a Uri or root element of an element tree, and allow the developer to specify whether the navigation is synchronous or asynchronous. It is also possible to pass arbitrary data (as an object) along with the navigation. This data can be retrieved in the navigation event handlers. The INavigator interface also exposes a Refresh method to refresh the content by reloading it from the source, a StopLoading method to cancel any pending download operation, and a GoForward and GoBack method to initiate a Journal navigation.

INavigator interface 317 implementations raise events for stages of navigation to allow complete flexibility for the developer to modify the behavior to suit the application 301. Navigating (fired before a navigation begins), LoadStarted (fired immediately after a navigation begins), NavigationProgress (fired periodically throughout the navigation to indicate how much has been downloaded and how much remains), NavigationError (fired when an error occurs in navigation or download), Navigated (fired when the target has been found and download has begun), and LoadCompleted (fired when all content has been downloaded and parsed) are examples. Of these, only the Navigating event can be canceled, which prevents the navigation from occurring.

The NavigationContainer class 319 provides an implementation of INavigator that is used by Frame. It can also be reused by third party component developers who want to implement new types of navigable elements or classes. In addition to INavigator, it also exposes IJournalData, which has methods to enable persisting state to the journal when navigating away from the current page, and restoring state when navigating back to it by way of the Journal (Back/Forward navigation).

NavigationWindow Class

The NavigationWindow class 321 is derived from the Window class 305, but also implements INavigator by delegating to a Frame element in its Visual Tree. Both Window and NavigationWindow support styling of their Visual tree. With NavigationWindow, styling enables part of the window to persist across navigations so that "navigation chrome" (back/forward buttons) remain as navigations occur.

Synchronous/Asynchronous Navigation

On the Web today, navigation is asynchronous. Some applications, particularly when installed locally, may prefer synchronous navigation so that UI on a page appears simultaneously. There are also times when a developer may want a particular navigation instance to be synchronous, for example, when navigating to a PageFunction (described below). If the developer wants to pass some state to the new PageFunction that will be reflected in the UI the PageFunction displays, he needs to be able to navigate to the UI and then set a property on it in the PageFunction's constructor. If the navigation is asynchronous, he can't do this because the element he wants to change may not have been parsed yet. The developer could use the LoadCompleted event for this, but the relevant element may already be displayed before it gets changed. Accordingly, the Application Model provides mechanisms to enable synchronous navigation.

By default, navigation is asynchronous unless otherwise specified. However, a developer may specify that an application's default navigation behavior is synchronous by setting the value of the Synchronous attribute in the application class 303 definition to "true". The developer can also specify that the default navigation behavior for a particular INavigator (NavigationContainer or NavigationWindow) is synchronous by setting the Synchronous attribute on the NavigationContainer object or NavigationWindow object to "true". If the default navigation behavior for the application is synchronous, a developer can override that for a specific NavigationContainer object or NavigationWindow object by setting the Synchronous attribute on it to "false." To specify synchronous navigation on a hyperlink, when the application or containing INavigator is not synchronous, a developer can set the value of the Synchronous attribute on the hyperlink to "true" (or vice versa).

Journaling

Journaling is the process by which the Navigation Framework tracks history. A "journal" enables users to retrace their steps backward and forward in a linear navigation sequence. Whether a navigation application is hosted in the browser or in a standalone NavigationWindow, each navigation is persisted in the journal, and can be revisited in a linear sequence by using the forward and back buttons or by invoking the GoForward and GoBack methods. Each NavigationWindow has its own Journal object.

Journal Class and JournalEntry Class

The default behavior of the Journal is the same as the Journal behavior of the browser today, thereby providing users with a familiar Web experience. In addition, the application 301 can insert virtual Journal entries that perform DOM operations on the current page, and applications can remove entries from the journal, but only within the application's own journal (not the system journal).

The Journal class 325 has the following methods: AddEntry, RemoveEntry, and GetEnumerator. GetEnumerator returns an enumerator over the current list of JournalEntries in the Journal. The RemoveEntry method takes an offset and removes the JournalEntry at that that offset in the Back stack. The overloaded AddEntry method allows the developer to insert a JournalEntry either at the current position, or at a specified offset. To add a journal entry to the journal, an application derives a class from the JournalEntry class 327.

The JournalEntry class 327 has two properties, Name and Uri. The name is the text that is displayed in a dropdown list on the Back/Forward buttons, and the Uri is the URI of the stored page. The JouranlEntry class 327 has only one method, called Replay. When adding a custom entry to the Journal, the derived class overrides the Replay method to perform arbitrary DOM operations on the tree to restore it to its previous state. The derived class should contain whatever properties or methods are necessary to store and replay the state changes. The overridden Replay method returns a new JournalEntry that undoes whatever action it performed in the method itself. This JournalEntry will be inserted in the Journal to be replayed when the inverse Journal navigation is performed.

For example, if the custom JournalEntry is being replayed as the result of a Back navigation, the JournalEntry returned by its Replay method is placed in the Forward stack. When the user navigates Forward, this journal entry is replayed, restoring the state of the page just prior to the Back navigation. Likewise, when a Forward navigation takes place, the returned JournalEntry is placed in the Back stack, so when the user navigates Back, the state of the page can be restored. The JournalEntry returned by the Replay method should perform the inverse of whatever operation the Replay method performed.

Classes derived from JournalEntry should implement ISerializable, so they can be stored in the system Journal if the application is hosted in the browser.

IJournalData Class

When a navigation takes place, the controls on the page that is going away are given an opportunity to persist their state to the journal, and to reload it when the user revisits the page. To persist its state in the journal, and restore it when the page is revisited, a control implements the IJournalData interface 323. The IJournalData class has two methods, Save and Load, and a PersistID property that is used by the Journal.

Structured Navigation

In many traditional applications, where the user is either familiar with the task, or where the user is creating arbitrary content, it is natural for the user to lead the application. For infrequent or complex tasks that require specific procedures to be followed in a specific order, it makes more sense for the application to lead the user. This is best accomplished by providing a structured navigation sequence through pages that each have a focused purpose, communicated to the user through a direct question or instruction, and a simple control layout so the user knows exactly what's expected at any given point. Structured navigation is well suited to this kind of application. The PageFunction class 329 is the building block for Structured Navigation.

Wizards tend to provide a single path of navigation through a series of steps, while Web pages generally allow arbitrary navigation. However, even many Web sites require a specific path for certain tasks. For example, a checkout line in a shopping application. Also, many wizards would be more effective and less frustrating to users if they could provide a non-linear navigation sequence, based on current state. For example, a wizard that requires an Internet connection to complete its main purpose would be more effective if it could detect when a user is already connected to the Internet, and bypass the steps to connect to the internet without having to present the user with that decision.

A PageFunction is like a Web page because it is invoked by a navigation request, and it can display UI like any other page. It is like a function because each PageFunction object encapsulates a unit of functionality. Its caller can pass state to it, and it can return a result when it has completed its purpose. PageFunctions can be nested and chained. A PageFunction can also invoke other PageFunctions and delegate to them to carry out all or part of its functionality. A PageFunction can determine the next action to take (or the next PageFunction to navigate to) based on accumulated state. A PageFunction can simply be a decision point that delegates to other PageFunctions, but has no UI itself. This allows for a very flexible navigation model, in which the user can be led through a complex procedure, omitting any steps that aren't relevant.

A PageFunction can also specify that once it completes, it and all of its children (other PageFunctions it invoked in the process of completing its purpose) should be removed from the Journal. An example of where this might be useful is when a user has completed a transaction, or made a purchase. For security reasons, it would be best if their credit card information isn't still available if someone should click the Back button. With the PageFunction class 329, the entire transaction can be removed form the Journal after the user reaches the confirmation page, so when the user clicks Back, he's returned to the point in the application before the transaction was started. Clicking Forward would return to the confirmation page.

PageFunction Class

The PageFunction class 329 uses Generics (similar to Templates in C++). This provides a way for the same class to be reused with different parameters in a strongly typed way. In the case of PageFunctions, the parameter represents the ReturnArgsType 330, which is the type of the value returned by the PageFunction on completion.

The PageFunction class 329 has two properties, RemoveFromJournal, which specifies whether the PageFunction and its children should be removed from the Journal after completion, and KeepAlive, which specifies whether the PageFunction should be kept in memory after navigating to a child PageFunction. By default, the parent is "dehydrated" when navigating to a child, and "rehydrated" when the child returns. This helps keep the working set down. However, some PageFunction classes are expensive to initialize so, in these cases, it may be worth the extra working set to not have to recreate the PageFunction whenever a child returns. This is an implementation decision that will be available to developers.

The PageFunction class 329 has two methods. A virtual Start method is overridden to initialize the PageFunction the first time it is navigated to. This method is not called when a child PageFunction returns, only when the PageFunction is invoked. A virtual OnFinish method is called by the PageFunction itself when it is ready to return to its caller. The parameter is also a Generic class that takes the same type as the Generic parameter for the PageFunction class. This is the value that is returned to the PageFunction's caller.

The PageFunction class 329 also has an event, called Return. Whoever invokes the PageFunction attaches a listener to this event. When the PageFunction returns, the caller gets the return value from the EventArgs for this event, which is parameterized with the same type as the PageFunction itself.

Localization

All resource access is done through relative URIs. When a resource is loaded, the URI is resolved to an absolute URI using the codebase of the application. Because URIs are resolved at run-time, resource requests can be remapped at run-time based on localization settings. For example, the codebase for the application http://myapp, a request for pages/page1.xaml may be found in the following locations, depending on the current localization setting:

http://myapp/pages/enu/us/page1.xaml
http://myapp/pages/enu/page1.xaml
http://myapp/pages/page1.xaml The Application Model allows for UI to be localized by replacing the entire markup associated with the UI. Since resource loading is done through the same mechanism, it is possible to localize any type of resource, not just string resources.

Security

Figure 4:
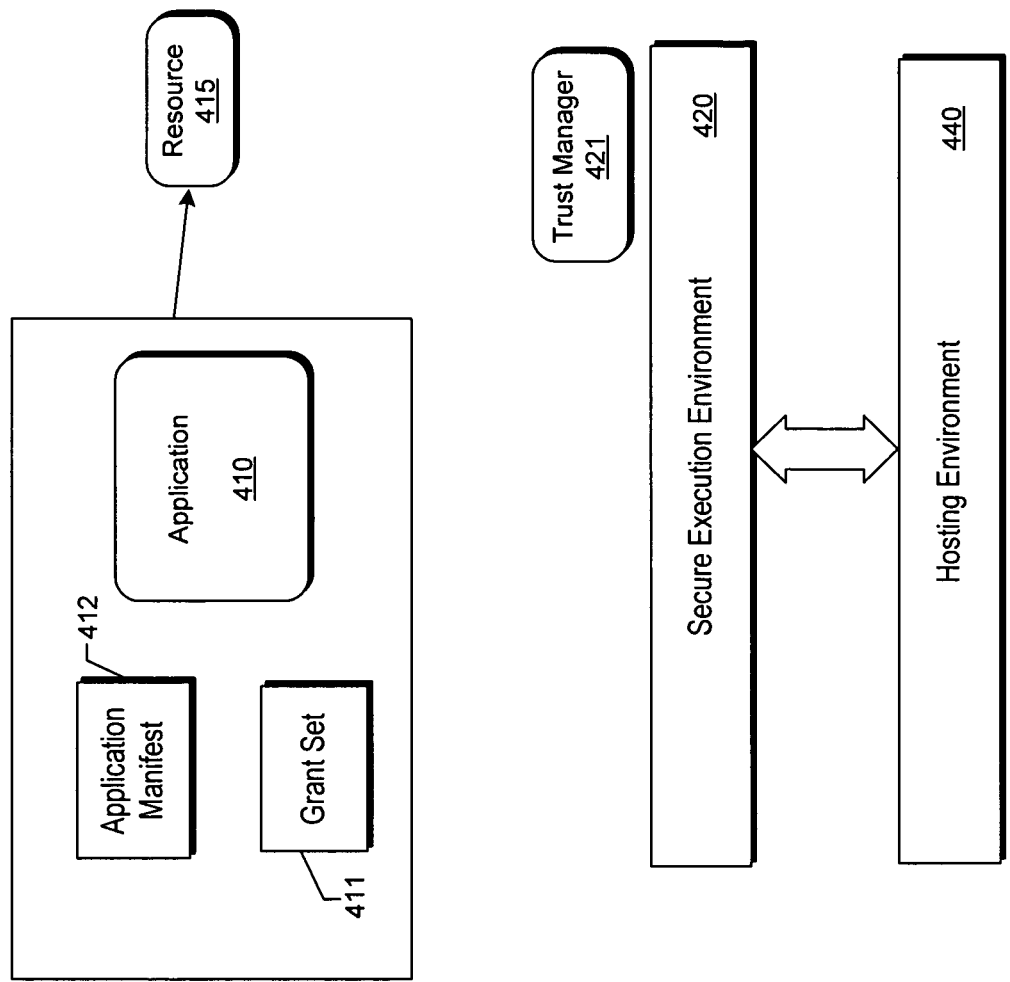
FIG. 4 is a functional block diagram illustrating components of a system that implements security in accordance with the Application Model.

FIG. 4 is a functional block diagram illustrating components of a system that implements security in accordance with the Application Model. Today, conventional desktop applications run with full trust. Once an application is installed, it can do anything that the user can do. Web applications, on the other hand, run with a restricted permission set. This helps protect the user from malicious or buggy applications that could do harm to the users machine or data. However, some legitimately safe applications require permissions beyond the restricted permission set to be able to carry out their intended functionality. In accordance with the Application Model, applications don't get full trust just because they're installed locally.

An application 410 in accordance with the Application Model runs in a Secure Execution Environment (SEE) 420. The SEE 420 defines a default permission set 425, which is more limited than that experienced by the typical desktop application installation. The SEE 420 may interact with a hosting environment 440 that provides policy-based enforcement of access rights to local resources. When the application 410 attempts to access a resource 414, the application's identity and site of origin are verified, and a check is performed to determine whether the application's permission grant set 411 allows it to access the requested resource 415. If so, then the requested access is allowed. If not, then the request is denied.

By default, applications run with the default permission set 425. Applications can request further permissions, if required, by specifying the permissions they need in the application manifest 412. If an application requires permissions beyond the default permission set, installation is required. At installation time, a Trust Manager 421 helps users decide if the application is trustworthy. At installation time, the Trust Manager 421 inspects the application manifest 412 to determine whether the application 410 is requesting any permissions beyond the default permission set 425. If so, the Trust Manager 421 evaluates the risk level of the permissions being requested, along with other factors, like whether the application 410 is signed, whether it meets logo requirements, etc., and determines an overall risk rating for the application 410. The Trust UI that is displayed to the user is different depending on the risk rating, to help the user make an informed decision. If the user doesn't grant the permissions requested, the application may not be installed or allowed to run. If the user accepts the heightened level of permissions requested, the application's permissions are stored in association with the application as the application's permission grant set 411.

The default permission set 425 is intended to allow maximum functionality without compromising the security of the system. For example, an application that needs to store configuration settings can use certain configuration APIs with the default permission set 425 that guarantee no application can overwrite or modify another application's settings. The default permission state may allow an application to store state other than settings, for example, any content or state that should not be rolled back when the application is rolled back. The default permission set 425 may allow the application 410 to launch File Open/Save dialogs. The File Open/Save dialogs provide a means for the user to store/retrieve content in a user-selected file location, without making this information available to the application 425. These activities are considered safe because they don't allow the application 410 direct access to the file system. However, if an application requires direct programmatic access to the file system, it must request File I/O permission, in which case, the user should be prompted by the Trust Manager 421 when the application 410 is installed.

Illustrative Computing Environment of the Invention

Figure 5:
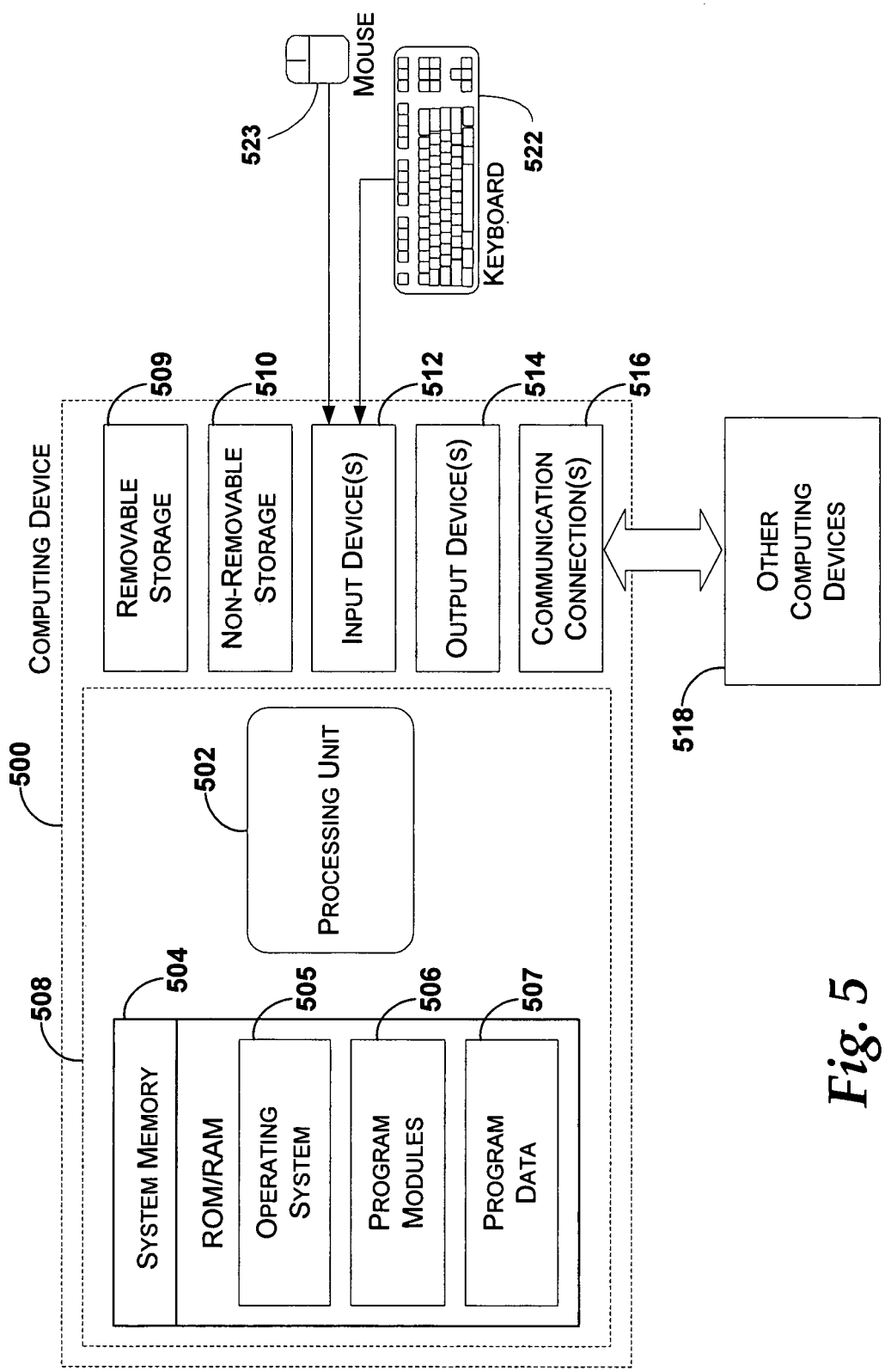
FIG. 5 illustrates a computing device that may be used in illustrative implementations of the present invention.

FIG. 5 illustrates a computing device that may be used in illustrative implementations of the present invention. With reference to FIG. 5, one exemplary system on which the invention may be implemented includes a computing device, such as computing device 500. In a very basic configuration, computing device 500 typically includes at least one processing unit 502 and system memory 504. Depending on the exact configuration and type of computing device, system memory 504 may be volatile (such as RAM), non-volatile (such as ROM, flash memory, etc.) or some combination of the two. System memory 504 typically includes an operating system 505, one or more program modules 506, and may include program data 507. This basic configuration of computing device 500 is illustrated in FIG. 5 by those components within dashed line 508.

Computing device 500 may have additional features or functionality. For example, computing device 500 may also include additional data storage devices (removable and/or non-removable) such as, for example, magnetic disks, optical disks, or tape. Such additional storage is illustrated in FIG. 5 by removable storage 509 and non-removable storage 510. Computer storage media may include volatile and nonvolatile, removable and non-removable media implemented in any method or technology for storage of information, such as computer readable instructions, data structures, program modules, or other data. System memory 504, removable storage 509 and non-removable storage 510 are all examples of computer storage media. Computer storage media includes, but is not limited to, RAM, ROM, EEPROM, flash memory or other memory technology, CD-ROM, digital versatile disks ("DVD") or other optical storage, magnetic cassettes, magnetic tape, magnetic disk storage or other magnetic storage devices, or any other medium which can be used to store the desired information and which can be accessed by computing device 500. Any such computer storage media may be part of device 500. Computing device 500 may also have input device(s) 512 such as keyboard 522, mouse 523, pen, voice input device, touch input device, scanner, etc. Output device(s) 514 such as a display, speakers, printer, etc. may also be included. These devices are well known in the art and need not be discussed at length here.

Computing device 500 may also contain communication connections 516 that allow the device to communicate with other computing devices 518, such as over a network. Communication connections 516 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Although details of specific implementations and embodiments are described above, such details are intended to satisfy statutory disclosure obligations rather than to limit the scope of the following claims. Thus, the invention as defined by the claims is not limited to the specific features described above. Rather, the invention is claimed in any of its forms or modifications that fall within the proper scope of the appended claims, appropriately interpreted in accordance with the doctrine of equivalents.

The invention claimed is:

1. A computer-readable storage medium memory device having processor-executable instructions stored thereon that, when executed by one or more processors, implement an application framework for developing an application, comprising:
    an application object that manages resources of an application;
    a navigation component that provides navigation functionality for the application;
    an application lifecycle management component that defines at least how the application is installed on a computing system; and
    a manifest that specifies a first subset of components of the application as required, a second subset of components of the application as on-demand, and a third subset of components of the application as online, with the first, second, and third subsets of components of the application differing, the second subset of components being downloaded in the background as a user interacts with the application, wherein when a specific component of the second subset of components is requested, the specific component takes precedence over remaining components of the second subset of components and is downloaded on-demand while the remaining components are downloaded contemporaneously in the background.

2. The computer-readable memory device as recited in claim 1, wherein the application framework further includes one or more components that define behavior of one or more windows associated with the application.

3. The computer-readable memory device as recited in claim 1, wherein the navigation component provides at least one of navigation functionality, journaling, journal extensibility, or structured navigation.

4. The computer-readable memory device as recited in claim 3, wherein the navigation component comprises a navigation object that identifies an initial resource to which the application navigates when launched.

5. The computer-readable memory device as recited in claim 4, wherein the navigation object further includes navigation related events that are invoked in response to an occurrence of a navigation.

6. The computer-readable memory device as recited in claim 1, wherein the first subset of components include minimum code for the application to execute on the computing system.

7. The computer-readable memory device as recited in claim 1, wherein the application framework further comprises a secure execution environment that defines a default set of permissions for the application during execution of the application in the secure execution environment.

8. The computer-readable memory device as recited in claim 1, wherein the application framework further comprises a component that defines a mechanism that allows the application to access common window properties of a hosting environment in a like manner regardless of whether the hosting environment is a browser or a standalone window environment.

9. A method comprising:
    accessing, by one or more processors of a computing device, an application at a network location, wherein the application includes at least one manifest that specifies a first subset of components of the application as required, a second subset of components of the application as on-demand, and a third subset of components of the application as online, with the first, second, and third subsets of components of the application differing;
    receiving, by the one or more processors of the computing device, the first subset of components of the application;
    executing, by the one or more processors of the computing device, the application;
    downloading, by the one or more processors of the computing device, the second subset of components as background process while enabling user interaction with the application; and
    in response to determining that a specific component of the second subset of components is requested, requesting, by the one or more processors of the computing device, the specific component with precedence over remaining components of the second subset of components, so that the specific component is downloaded on-demand while the remaining components of the second subset of components are downloaded contemporaneously as the background process.

10. The method as recited in claim 9, wherein accessing the application further comprises invoking, on the computing device, an installer that controls download and installation of the application based at least in part on the at least one manifest.

11. The method as recited in claim 9, further comprising invoking, on the computing device, a secure execution environment that defines a default set of permissions for the application during execution of the application in the secure execution environment.

12. The method as recited in claim 9, further comprising:
    storing the first subset of components and the second subset of components in an application cache; and storing the third subset of components in a transient cache.

13. The method as recited in claim 9, wherein the accessing the application further comprises navigating a browser to the network location in response, at least in part, to receiving a user input.

14. The method as recited in claim 13, further comprising following installation of the application on the computing device, launching the application from local storage of the computing device in response to subsequent navigation of the browser to the application.

15. A system comprising:
   one or more processors;
   a memory storing processor-executable instructions that, when executed by the one or more processors, program the one or processors to:
      implement an application framework that includes:
         an application object that manages resources of an application;
         a navigation component that provides navigation functionality for the application; and
         an application lifecycle management component that includes at least one manifest that specifies a first subset of components of the application as required, a second subset of components of the application as on-demand, and a third subset of components of the application as online, with the first, second, and third subsets of components of the application differing;
      in response to a request from a computing device, send the first subset of components to the computing device to enable user interaction with the application while the second subset of components are downloaded as a background process on the computing device during the user interaction with the application; and
      in response to a request from the computing device for a specific component of the second subset of components, sending the specific component with precedence over remaining components of the second subset of components while the remaining components of the second subset of components are downloaded contemporaneously as the background process.

16. The system as recited in claim 15, wherein the application object at least one of: isolates the application from other applications or external resources, raises startup and shutdown events for the application, or manages application windows.

17. The system as recited in claim 15, wherein the navigation component provides at least one of: navigation functionality, journaling, journal extensibility, or structured navigation.

18. The system as recited in claim 15, wherein the application lifecycle management component further defines at least one of: how the application is deployed, activated, updated, rolled back, or removed from the computing device.

19. The system as recited in claim 15, wherein the application framework further comprises a secure execution environment that defines a default set of permissions for the application during execution of the application in the secure execution environment.

20. The system as recited in claim 15, wherein the first subset of components includes minimum code for the application to execute on the computing device.

* * * * *